March 13, 1928.
J. C. WOODSON
1,662,556
THERMOSTATIC CONTROL DEVICE
Filed June 23, 1926
2 Sheets-Sheet 1
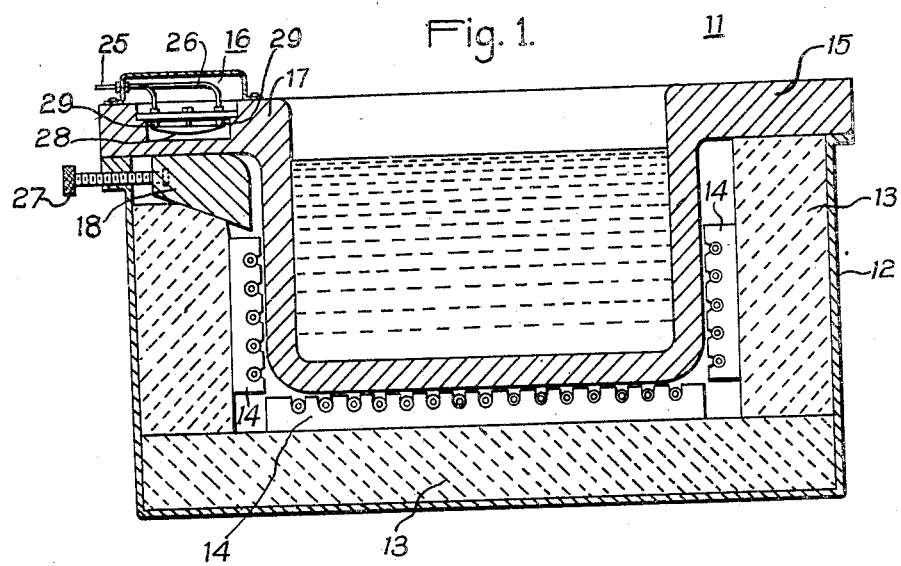
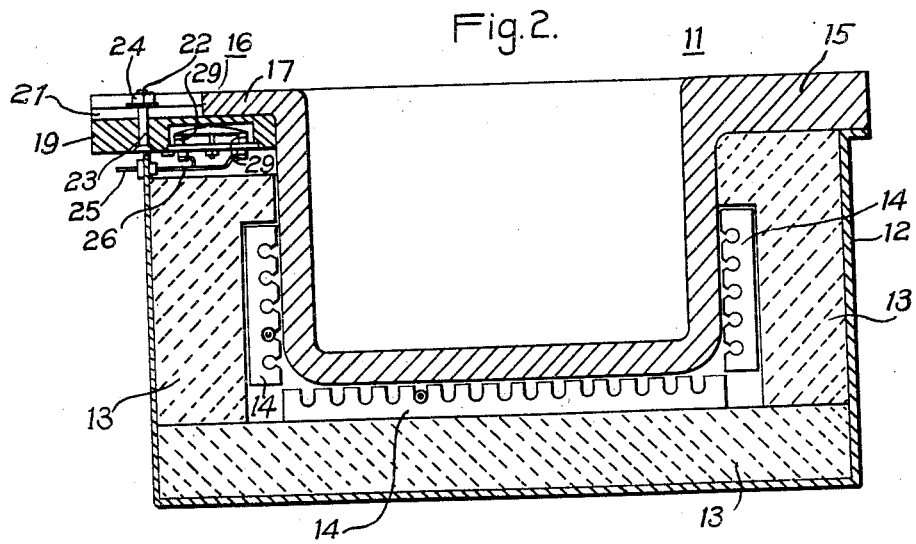
INVENTOR
James C. Woodson.
WITNESSES:
BY
ATTORNEY March 13, 1928.  
J. C. WOODSON  
THERMOSTATIC CONTROL DEVICE  
Filed June 23, 1926
1,662,556
2 Sheets-Sheet 2
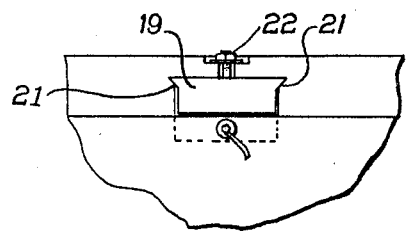
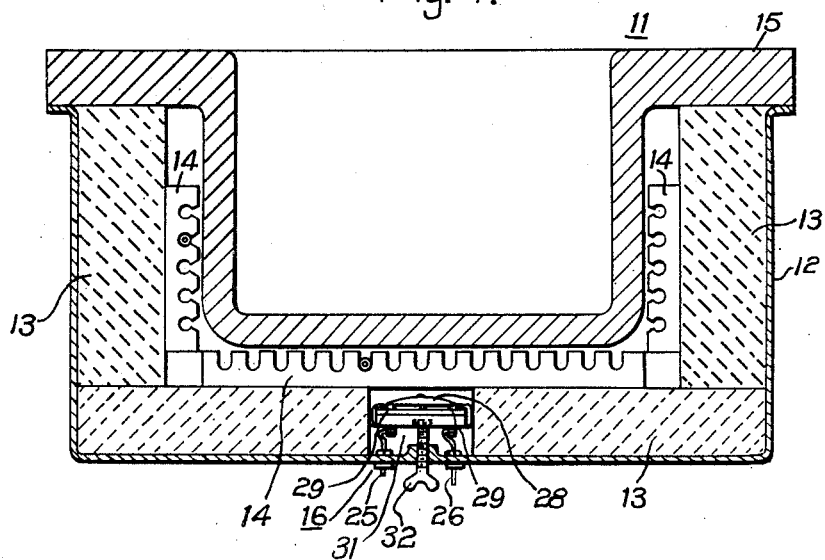
WITNESSES:
INVENTOR  
James C. Woodson.  
BY  
ATTORNEY Patented Mar. 13, 1928.

1,662,556

UNITED STATES PATENT OFFICE.

JAMES C. WOODSON, OF EAST PITTSBURGH, PENNSYLVANIA, ASSIGNOR TO WESTINGHOUSE ELECTRIC & MANUFACTURING COMPANY, A CORPORATION OF PENNSYLVANIA.

THERMOSTATIC CONTROL DEVICE.

Application filed June 23, 1926. Serial No. 117,924.

My invention relates to electrically-heated devices and particularly to the thermostatic control devices therefor.

An object of my invention is to provide a thermostat for an electrically-heated device that shall be effective to control the temperature of a body to be heated over a relatively wide range of temperatures.

Another object of my invention is to provide a thermostat for an electrically-heated device that shall be operative at a relatively low temperature and that shall be effective to control the temperature of a body to be heated over a relatively wide range of high temperatures.

Another object of my invention is to provide a thermostat for an electrically-heated device that shall have means associated therewith for controlling the rate of heat conduction thereto from a body to be heated, whereby the thermostat will be operable to control the temperature of said body over a wide range of temperatures.

In practicing my invention, I provide a thermo-responsive device for controlling the energization of electric resistors which are employed for heating a body of material. The thermostat is disposed in thermal relation with the body to be heated and means are provided for controlling the rate of heat conduction thereto from the body whereby an even temperature thereof may be maintained.

In the accompanying drawings,

Figure 1 is a view, in vertical section, of an electrically-heated device in which is provided one form of a thermo-responsive device for controlling the temperature thereof;

Fig. 2 is a view, in vertical section, of the device illustrated in Fig. 1 in which a modified form of the thermo-responsive device is employed.

Fig. 3 is an end view of the thermo-responsive device employed in Fig. 2; and

Fig. 4 is a view, in vertical section, of the electrically-heated device illustrated in Figs. 1 and 2, in which the thermo-responsive device is mounted at the bottom of the device to be heated.

Referring more particularly to Fig. 1 of the drawings, an electrically-heated device 11, such as a solder pot, comprises a casing 12, refractory walls 13, heating units 14 and a vessel 15. A thermo-responsive device 16 is mounted on a flange 17 of the vessel 15, and an adjustable heat storage mass 18 is mounted, in thermal relation therewith, at the underside thereof.

The walls 13 may be made of any suitable electric-insulating material known in the art and the vessel 15 may be made of any suitable metal, such as nickel-steel or other metal which will withstand high temperatures without excessive oxidation. As a specific construction of electric heating device 11 forms no particular part of my invention, it is not believed necessary to describe it further in detail.

In Fig. 2, I have illustrated a modified form of the thermo-responsive device 16. In this particular embodiment of my invention, the device 16 is secured to a movable member 19 which is free to slide horizontally within a dove-tailed groove 21 located in the flange 17. A locking means 22, which comprises a bolt member 23 and a nut 24, is provided for maintaining the thermo-responsive device 16 in any predetermined position.

Conductors 25 and 26 are provided for the device 16, whereby a control circuit (not shown) for the heating units 14 may be controlled in accordance with the temperature at which material located within the vessel 15 is to be maintained.

By moving the member 19 inwardly towards the member 15, the thermo-responsive device 16 will be subjected to a temperature which approaches the temperature of the body to be heated within the vessel 15. The closer the thermostat 16 is to the material to be heated, the lower will be the temperature of the material contained in the vessel 15, because the operating temperature of the thermo-responsive device 16 will be attained at a lower temperature of the material than if the member 19 were moved farther away from the vessel 15.

Likewise, in Fig. 1 of the drawings, if the member 18 is moved inwardly towards the vessel, 15, by means of an adjusting screw 27, the thermo-responsive member 16 will be subjected to a temperature which approaches that of the body of material to be heated. Conversely, if the member 18 is moved outwardly away from the vessel 15, the thermo-responsive device 16 will be subjected to a lower temperature, with the result that the material to be heated within the container 15 will have attained a higher temperature before an operating temperature of the thermostat 16 occurs.

When the operating temperature of the member 16 is attained, the member 28 of the thermo-responsive device 16 is disengaged from the contact members 29, whereby the heating units 14 will be deenergized.

In Fig. 4 of the drawings, the thermo-responsive device 16 is mounted in an aperture 31 in the bottom wall of the electrically-heated device 11. An adjusting screw 32 is provided for moving the thermo-responsive member 16 vertically towards or away from the heating unit 14. If the device 16 is located in close proximity to the heating units 14 the device 16 will operate to deenergize the heating units 14 before a very high temperature is attained within the material located in the vessel 15. If the device 16 is located at a relatively large distance below the heating unit 14, the temperature to which the device 16 is subjected will, consequently, be lower and any material to be heated in the vessel 15 will be heated to a much higher temperature before the member 16 has attained a temperature sufficient to separate the contact members 29.

While I do not wish to be limited to a particular form of the thermostat to be employed in my device, I propose to use one which is described and claimed in a U. S. patent to J. A. Spencer, No. 1,448,240.

The operation of my device is best illustrated by referring to Figs. 1, 2 and 4 of the drawings. The operation of the thermo-responsive device 16 is dependent upon the temperature to which it is subjected. If the member 18 of Fig. 1 is located in close proximity to the wall of the vessel 15, any material which is maintained at a certain temperature therewithin will transmit heat thereto. The member 18 may be of any suitable material, such as copper or nickel and which has a high heat-storage capacity. The portion of the vessel 15 directly below the thermo-responsive device 16 may be made of such thickness that the heat from the member 18 will be conducted readily thereto.

It is evident from the drawings that, if the member 18 is in close proximity to the walls of the vessel 15, it will be maintained at a higher temperature and, obviously, the thermo-responsive device 16 will also be subjected to the higher temperatures. Since the device 16 is operable at some certain predetermined temperature, the member 18 will conduct more heat from the body of the material within the vessel to be heated when it is in close proximity thereto and will, therefore, operate to cause the device 16 to deenergize the heating units 14 when the material within the vessel 15 is at a relatively low temperature. By moving the member 18 away from the walls of the vessel 15, the temperature thereof will be in accordance with the temperature of the material to be heated, but a much higher temperature will be necessary in the material contained in the vessel 15 to transmit the required amount of heat to the member 18 in order to cause the thermo-responsive device 16 to operate to deenergize the heating units 14.

When the heating units have been deenergized and the member 18 has cooled sufficiently, the device 16 will also follow the drop in temperature and operate to again energize the heating units 14, whereby the material will increase in temperature. By a series of such operations, in which the thermo-responsive device controls the energizing and deenergizing of the heating units 14, the material within the vessel 15 will be maintained at a relatively uniform temperature.

The operation of the device illustrated in Fig. 2 is substantially the same, in principle, as the operation of the device illustrated in Fig. 1, except that the thermostat 16 is moved away from or towards the walls of the vessel 15 in accordance with a temperature to be maintained therein. The device illustrated in Figs. 1, 2 and 4 of the drawings may be employed for maintaining low-melting-point materials, such as solder or babbitt, in a molten state.

Various modifications may be made in the device embodying my invention without departing from the spirit and scope thereof. I desire, therefore, that only such limitations shall be placed thereon as are imposed by the prior art and the appended claims.

I claim as my invention:

1. In an electric heating device, the combination with a vessel for containing a body of material to be heated, electric heating means disposed in thermal conductive relation thereto, a thermostat for controlling the energization of said heating means, of means for varying the amount of heat conveyed to said thermostat from the material to be heated in accordance with a predetermined temperature to be maintained in said material.

2. In an electric heating device, the combination with a vessel for containing a body of material to be heated, electric heating means disposed in thermal conductive relation thereto, thermo-responsive means for controlling said heating means, of means for controlling the rate of heat conduction to said thermo-responsive device from said body of material in accordance with a predetermined temperature to be maintained therein.

3. In an electric heating device, the combination with a vessel for containing material to be heated, electric heating units disposed in close proximity thereof, a thermo-responsive device for controlling said heating units, of means for changing the relative position of said thermostat with respect to the material to be heated in accordance with a predetermined temperature at which said material is to be maintained.

4. In an electric heating device, the combination with a vessel for containing a body of material to be heated, electric heating means disposed in thermal conductive relation thereto, a thermostat for controlling the energization of said heating means, of means for regulating the amount of heat conveyed to said thermostat from said material to be heated, comprising a mass of heat-storage material in heat-conductive relation to the material to be heated, and adjusting means for moving said thermostat relatively to said mass in accordance with a predetermined temperature to be maintained in said material.

5. In an electric heating device, the combination with a container, electric heating units for heating material therein, a thermo-responsive device for controlling said heating units, said device being disposed in thermal relation with said container, of means for regulating the amount of heat conducted to said thermo-responsive device.

6. In an electric heating device, the combination with a container, electric heating units for heating material in said container, a thermo-responsive device for controlling said heating units, said device being disposed in thermal relation to said container, of means for controlling the temperature to which said thermo-responsive device is subjected comprising a mass of material having a high heat-storage capacity and thermal conductivity, and means for changing the position of said mass with respect to said thermo-responsive device.

7. In an electric heating device, the combination with a container, electric heating units therefor for heating material contained therein, a thermo-responsive device for controlling said heating units in accordance with a predetermined temperature to be maintained in said material, said device being located out of direct thermal relation with said material, of means for conducting heat from said material to said thermo-responsive device comprising a mass of heat-storage material and means for moving said mass relatively to said material and said thermo-responsive device.

In testimony whereof, I have hereunto subscribed my name this 17 day of June, 1926.

JAMES C. WOODSON.